United States Patent [19]

Slanker

[11] Patent Number: 5,108,229
[45] Date of Patent: Apr. 28, 1992

[54] PIPE INSTALLER AND METHOD FOR INSTALLATION OF PIPE

[75] Inventor: Ted M. Slanker, London, Ohio

[73] Assignee: Advanced Drainage Systems, Inc., Columbus, Ohio

[21] Appl. No.: 647,949

[22] Filed: Jan. 30, 1991

[51] Int. Cl.⁵ .............................. F18L 1/32; F18L 1/28
[52] U.S. Cl. .................... 405/181; 405/180
[58] Field of Search ............... 405/180, 181, 182, 183, 405/164, 165, 184

[56] References Cited

U.S. PATENT DOCUMENTS

| | | | |
|---|---|---|---|
| 1,886,510 | 11/1932 | Murphy | 405/181 |
| 2,638,832 | 5/1953 | Kinsinger | 405/180 X |
| 3,170,301 | 2/1965 | Kelley | 405/181 |
| 3,348,383 | 10/1967 | Kelley | 405/181 |
| 3,515,222 | 6/1970 | Kant | 425/183 X |
| 3,684,030 | 8/1972 | Lucero | 405/180 X |
| 3,905,200 | 9/1974 | Ylinen | 405/180 X |
| 4,260,290 | 4/1981 | Flippin | 405/181 |
| 4,744,696 | 5/1988 | Vidler | 405/180 |
| 4,892,443 | 1/1990 | Kunze et al. | 405/164 |

FOREIGN PATENT DOCUMENTS 1138561  6/1957  France .................. 405/180

Primary Examiner—Randolph A. Reese
Assistant Examiner—John A. Ricci
Attorney, Agent, or Firm—Biebel & French

[57] ABSTRACT

A device for installing pipe is provided comprised of a chassis and pivotal shoe connected to such a chassis. The chassis is formed with a metallic frame supported above the ground by a pair of wheels and at its forward-most portion by a hitch and skid plate. The chassis includes an upright beam and at least one support beam as well as a main beam which extends longitudinally from the front of the frame until it engages with the shoe. A pair of cylinders connect the main beam to the upright beam and shoe respectively. The shoe is preferably hollow with a pipe channel interconnecting the front and rear walls. Preferably the device includes a laser system of the type known in the art.

14 Claims, 4 Drawing Sheets

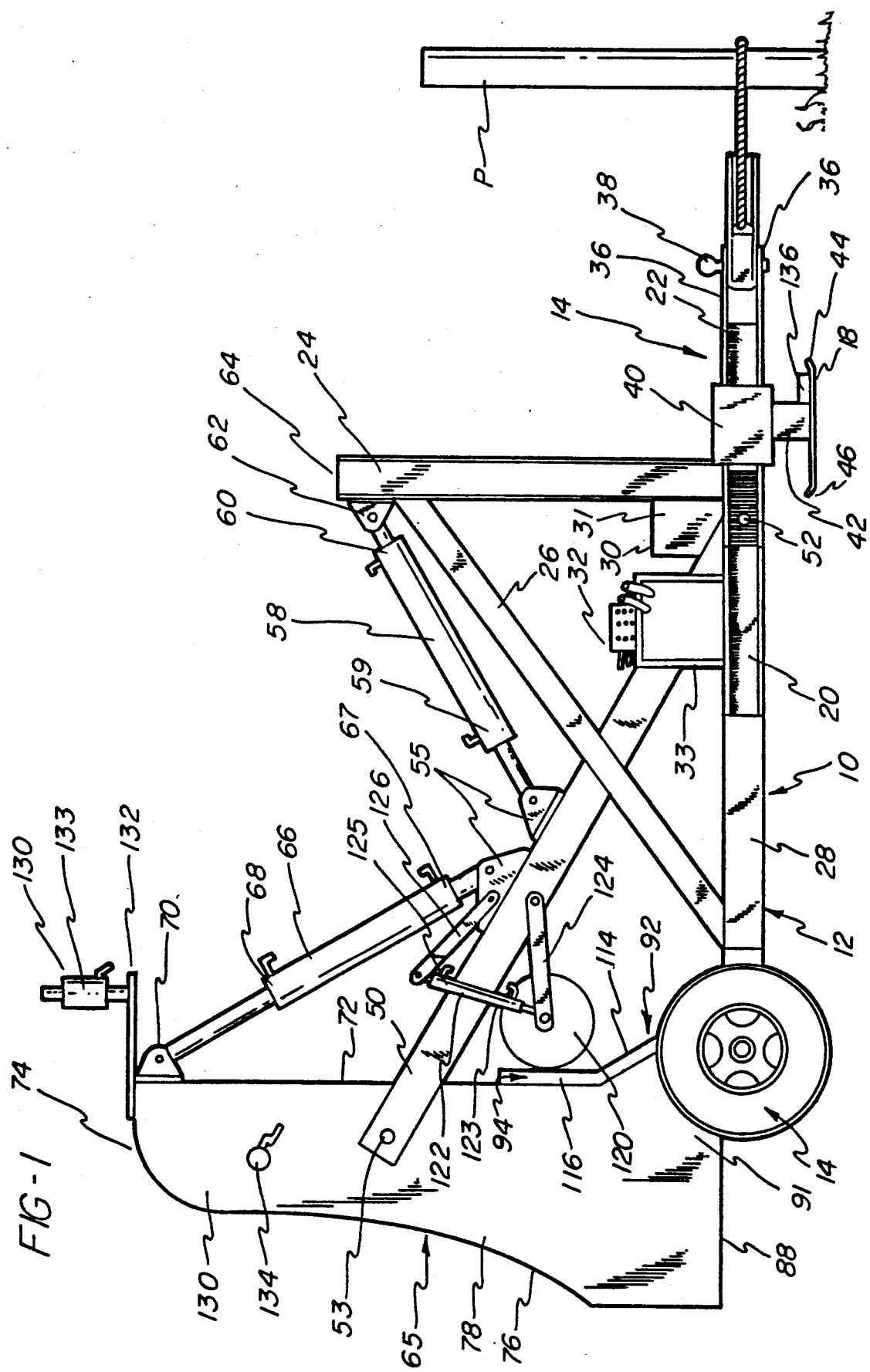

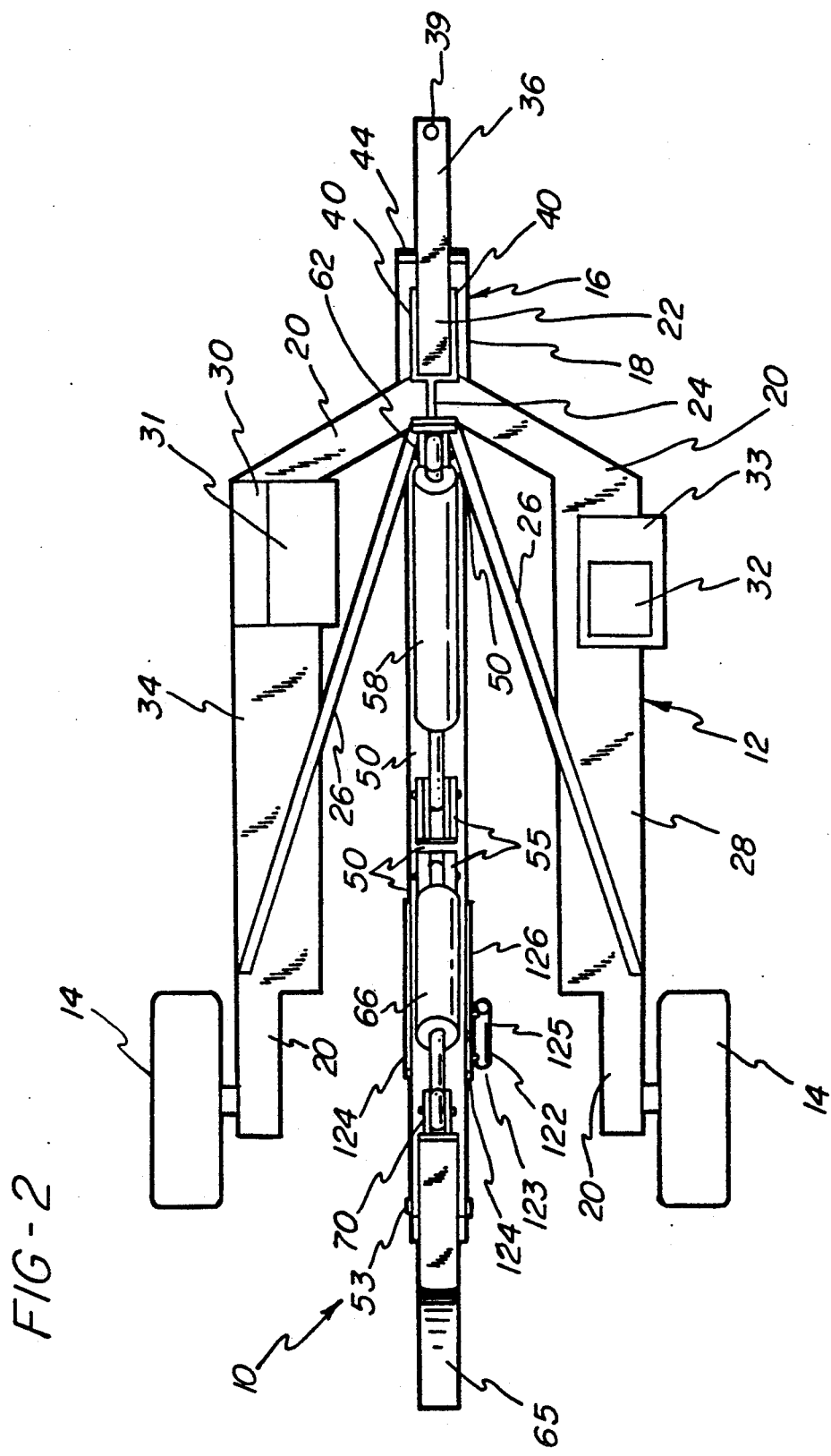

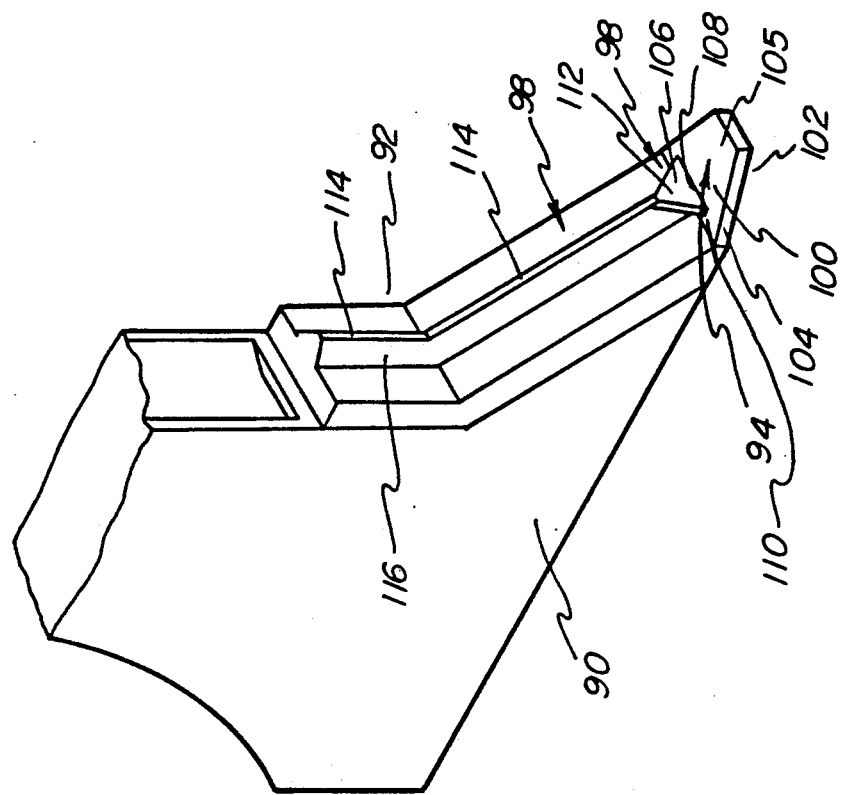
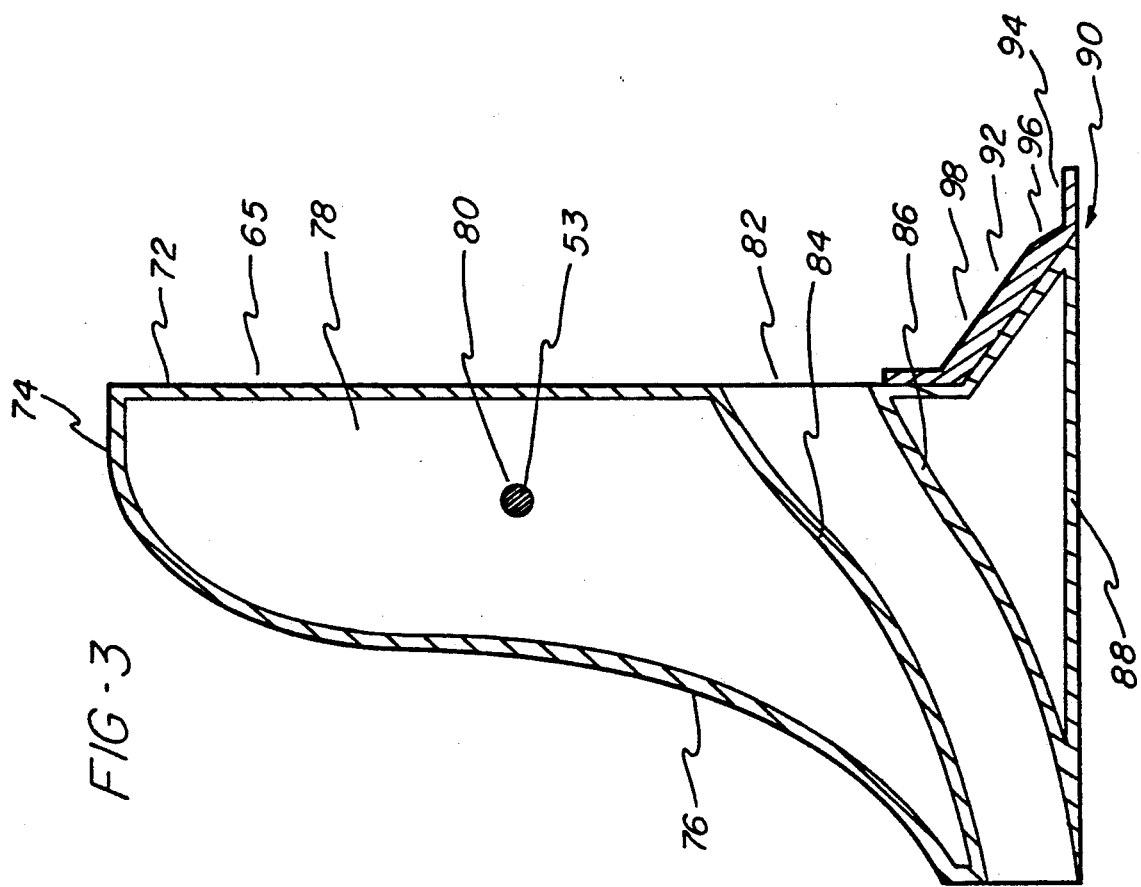
FIG-4
FIG-3

PIPE INSTALLER AND METHOD FOR INSTALLATION OF PIPE

FIELD OF THE INVENTION

This invention relates to a machine for installing pipe, and more particularly to a machine for installing pipe of a flat tubular structure which preferably can be used in drainage.

BACKGROUND OF THE INVENTION

This invention is directed to the providing of a suitable pipe installation device which is designed to be utilized in the providing of adequate sub-surface drainage. Drainage pipe has been used for some time in connection with the agricultural drainage business. In that application conduit is placed under the fields to assist in their drainage.

With respect to machines for installing agricultural drainage pipe, the typical method involves the excavation of a trench, typically through the use of a machine weighing approximately 60,000 pounds such as a treaded tractor or back-hoe, with the dirt being dumped on the ground next to the open trench. the drainage pipe is then laid in the trench and the dirt is redeposited into the trench.

A so-called trenchless method also exists, whereby a treaded tractor or other similar device slices a path through the soil using a device with approximately a 9" outer diameter to simultaneously feed drainage pipe typically cylindrical in cross-section down from the top surface of the shoe and into the bottom of the crevice thus created.

With both the trench and trenchless methods of installing drainage pipe, the existing turf is greatly disturbed. However, with respect to the drainage of agricultural areas such as fields, the typical method and machine do not adversely affect the on-going business of raising crops.

Unfortunately, drainage systems are not solely used in connection with agricultural applications. Golf courses, football fields, soccer fields, baseball diamonds, and other scenic establishments, many of which may be commercial, require adequate drainage. Use of the prior-art self propelled devices may force the complete closure for example of golf course for a day or more in order for one fairway or hole to be drained. Commercially, this can be disastrous for golf course operators, not to mention discouraging for those individuals who use the facilities.

Until now, the only method and machine available has been of the type associated with the installation of agricultural drainage systems. In addition to forcing the closure of the facility for a relatively lengthy time, the turf is noticeably disturbed following installation of the drainage system. Often mounds of fill dirt are still present, excessive dirt or mud is visible, and unsightly ruts or mounds which must be either reseeded or resodded confront the user. Thus, the lost time and expense may act as a deterrent to solving the drainage problem.

It is thus apparent that the need exists for an improved machine for installing pipe and the method of using same which provides for the installation of drainage pipe with minimal disturbance of the turf.

SUMMARY OF THE INVENTION

In accordance with this invention, a device for installing pipe is provided for advantageous use in the installation of pipe, preferably drainage pipe, and more preferably for use with pipe which is useful in recreational drainage applications. The device is comprised of a chassis and pivotal shoe connected to such chassis. The chassis is formed having a metallic frame, preferably from a plurality of beams, and is supported above the ground at its rear by a pair of wheels and at its forward most poriton by a hitch, which hitch may be secured to a motorized vehicle such as a tractor, or alternatively be attached to a winch. A skid plate depends downwardly from the forward portion of the device to assist in maintaining the chassis a spaced distance above the ground.

In addition to the portion of the chassis which forms the main frame and the hitch portion, the chassis includes an upright beam and at least one support beam with its opposite ends secured respectively to the frame and the upright beam. The main beam extends longitudinally along the midpoint of the device from the front of the frame rearwardly until it engages with the shoe. Depending upwardly from the main beam are a first cylinder, which has its opposite end secured to the upright beam, and a second cylinder, which has its opposite end securd to the shoe.

The shoe is a preferably hollow structure having a pipe channel interconnecting the front wall and the rear wall of the shoe and through which channel pipe may be fed. The shoe pivots relative to the main beam as well as having its location adjusted relative to the chassis.

The device also includes a fuel tank, a hydraulic fluid tank, a battery, a motor and hydraulic controls. The device also preferably includes a coulter which is adjustably secured to the main beam. The device also preferably includes a laser system comprising a laser and a slope sensor, which laser system in conjunction with the hydraulic system ensures that the pipe is being laid at the correct depth, as well as incline, necessary for proper drainage.

The primary objective of this invention is to provide a device for installing pip that is of extremely economical construction and is particularly easy to utilize in the laying of pipe in areas subject to heavy recreational use. Important aspects of this objective are the fabricating of a machine which is of substantially less weight than prior art pipe installation machines. Another important aspect of this objective is the fabrication of a machine which can utilize a method to result in less disturbance to the turf and less cleanup and turf restoration.

Another important objective is the fabrication of a device for installing pipe which permits the relatively rapid installation of drainage pipe. This important objective is furthered by the fabrication of a device which may be pulled at a speed greater than that typically associated with machines which lay pipe.

Another objective of this invention is to provide a method for installing pipe which results in less disturbance to the turf and which leaves the turf needing less restorative effort.

Other objects and advantages of the invention will be apparent from the following description, the accompanying drawings, and the appended claims.

BRIEF DESCRIPTION OF THE DRAWINGS

FIG. 1 is a side elevational view of a device for installing pipe in accordance with the present invention.

FIG. 2 is a top plan view thereof.

FIG. 3 is a vertical sectional view of the shoe component of the invention.

FIG. 4 is a perspective view on a greatly enlarged scale of the earth engagement means and forwardly extending portion of the shoe.

DETAILED DESCRIPTION OF THE DRAWINGS

Figure 5:
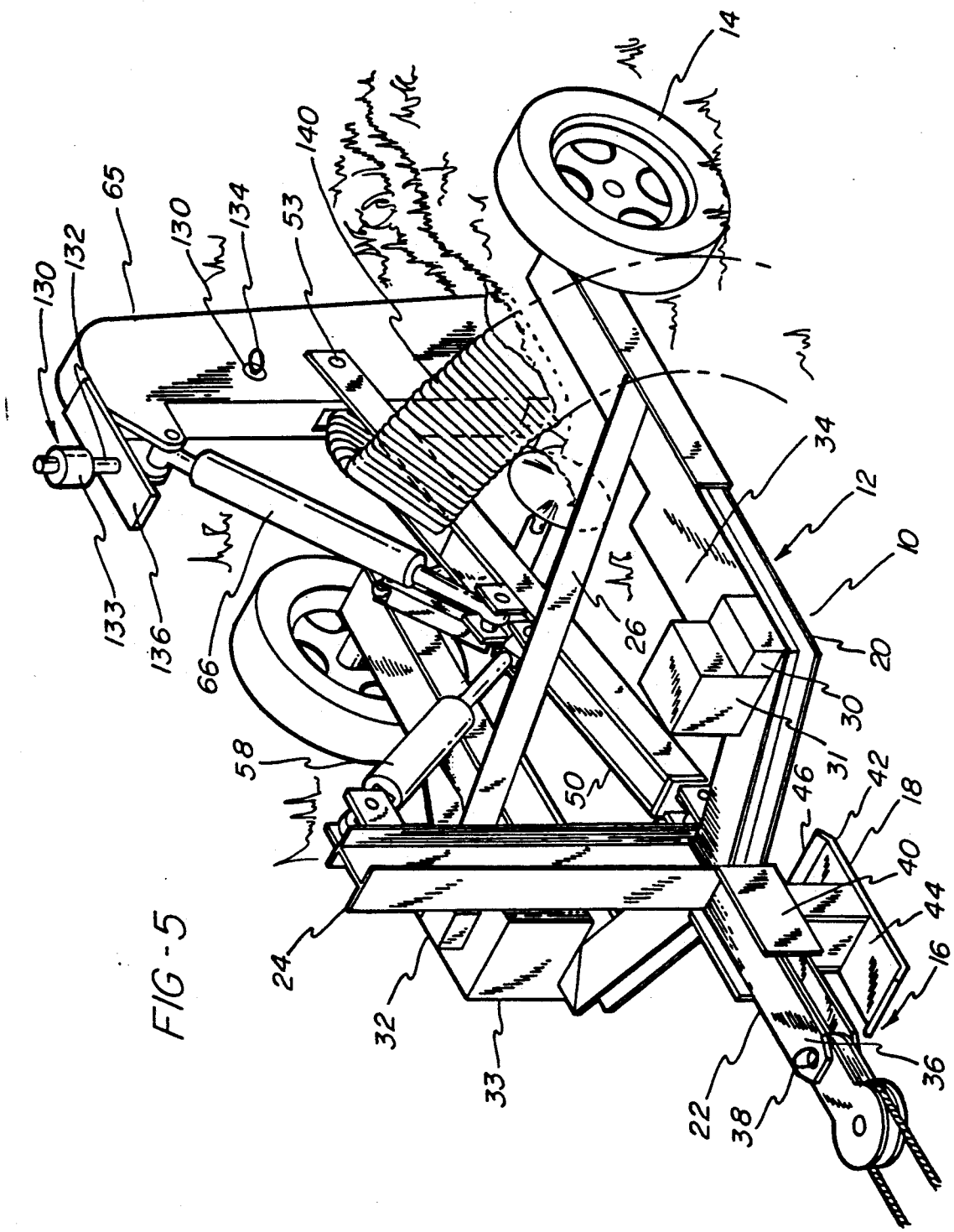
FIG. 5 is a perspective view showing the invention being used to install pipe.

Having reference to the drawings, attention is directed first to FIGS. 1 and 2 which illustrate a device for installing pipe embodying this invention designated generally by the numeral 10. As can be seen in the drawings, the pipe installer 10 is comprised of a chassis 12 supported at its rear with respect to the ground by wheel 14 and supported at its forward portion by a hitch portion 16, having a skid plate 18 attached thereto. The chassis is preferably fabricated from metal such as iron or steel with the wheels 14 secured to the chassis by an axle similar to that used with house trailers or through the use of flotation type implement tires. A skid plate 18 is preferably spaced a predetermined distance below the hitch portion such that the chassis and hitch portion are oriented approximately parallel to the ground. The skid plate is approximately 7" wide.

Chassis 12 is comprised of frame beam 20, hitch beam 22, upright beam 24 and support beam 26. The frame beam 20 is in the configuration of a V having 4 faces. While it is possible that the frame beam 20 could be formed from a unitary beam, it is more practical to form it from at least 4 beams joined to one another to form frame beam 20. It should also be understood that other geometric configurations could be chosen for the frame beam.

The hitch beam 22 extends forwardly from frame beam 20 the length of hitch portion 16. Upright beam 24 is preferably positioned at the juncture of the hitch portion 16 and chassis 12 such that it is secured to frame beam 20 as well as hitch beam 22. A support beam, or preferably at least a pair of such support beams serve as frame stabilization arms and have their opposite ends secured respectively to the frame beam 20 and upright beam 24. The portion of support beam 20 which is secured to frame beam 20 is secured thereto forwardly of wheel 14, while the portion of support beam 26 secured to upright beam 24 is secured near the top of upright beam 24, such that support beam 26 is inclined upwardly from the frame beam to the upright beam.

A fuel tank 28 is provided along one side of the frame beam. Additionally, a battery 30 is secured on the opposite side front that of the fuel tank near the front of the chassis. A motor 31 is positioned near battery 30. In the preferred embodiment of this invention a 2 cylinder motor generating 18 hp is used since the device needs to be operated with a minimum of 8-10 hp. The battery 30 is used to start the motor as well as to run the laser system associated with the invention. Adjacent to and above fuel tank 28 are hydraulic controls 32 which preferably are secured to a stand 33 which is in turn secured to frame beam 20. A hydraulic fuel tank 34 is fabricated as part of the chassis along that portion of frame beam 20 opposite from the location of fuel tank 28.

Hitch portion 16 has hitch beam 22 terminating at its forward most portion in a pair of hitch plates 36. A hitch pin 38 passes through hitch pin aperture 39 in each of hitch plates 36 to affect the attachment of the device 10 to a means for pulling the device across the ground. This means for pulling P may be a small tractor, or a winch device using cable and other parts of such devices as are commonly known in the art of winches. Hitch beam panels 40 are secured to the opposite sides of hitch beam 22 rearwardly of hitch plates 36, above skid plate 18, and forwardly of upright beam 24. Skid plate 18 is formed and spaced a distance from hitch beam 22 by means of skid support 42. The skid plate 18 is similar to skid plates previously known to exist and has a plate front edge 44, as well as plate rear edge 46.

A main beam 50 bisects the chassis along the longitudinal axis of the device 10 as can best be seen in FIG. 2. This main beam 50 is secured to the chassis 12 at frame beam 20 by main beam first pivot pin 52 as can best be seen in FIG. 1. The opposite end of main beam 50 is secured by means of a main beam second pivot pin 53. Located approximately midway between the forward most portion of main beam 50 and the rear end of that beam is a main beam bracket 55 which may be fabricated from either one or two brackets. Main beam bracket 55 is preferably secured to the top surface of the main beam and has secured thereto a number of cylinders.

Transport cylinder 58 is secured at its first end 59 to main beam bracket 55 while having its second end 60 secured to upright beam bracket 62. Upright beam bracket 62 is located on the rear surface of the upright beam 24 between the location where the frame stabilization arms 26 are secured to the upright beam 24 and upright beam top 64. The role of the transport or lift cylinder 58 is to raise the inclination of main beam 50 relative to chassis 12. This cylinder plays an especially important role during the transportation of the device to the actual place where the pipe is to be installed. A secondary roles is played in the actual installation process with respect to assisting in the depth control feature of the device.

At the rear of the device is shoe 65 which is a large preferably metallic sided structure which has main beam 50 secured thereto at main beam second pivot pin 53. Shoe 65 also has connected to it grade cylinder 66. The first end 67 of the grade cylinder is connected to main beam bracket 55, while the second end 68 of the grade cylinder is connected to shoe bracket 70 which is located near the top of the shoe front wall 72. The function of the grade cylinder is to vary the attack angle associated with shoe 65.

The shoe 65 also has a shoe top 74 and a somewhat sloping shoe rear wall 76 in addition to opposing shoe side walls 78. Extending from one shoe side wall to the other is main beam second pivot pin aperture 80 through which main beam second pivot pin 53 passes. Shoe 65 has enclosed therein pipe channel 82 as can best be seen in FIG. 3. Pipe channel 82 is formed having an upper channel wall 84 and a lower channel wall 86 which lower channel wall 86 terminates near shoe bottom 88. Meanwhile, the upper channel wall extends from approximately midway up the shoe front wall 72 and thence sloping downwardly until it terminates at the shoe rear wall 76.

While the pipe channels associated with prior art machines extended from the top surface downwardly through the shoe at a typical outer dimension of 9", the device disclosed by this invention permits the outer diameter of the shoe from side wall to side wall to be approximately 3" with the inner diameter being approximately 2¼". Having the channel begin mid-way up the front wall in prior art machines would have been impossible due to interference with the linkages of those machines. The thickness of the shoe rear wall is approximately ⅜" while the upper and lower channel walls 84 and 86 respectively are of a thickness of approximately ¼".

The shoe 65 also includes s forwardly extending portion 90 which extends forwardly of the pipe channel 82. This forwardly extending portion as can be seen in FIGS. 1, 3, and 4 includes earth engagement means 92. With this earth engagement means 92 comprising three separate portions. The first portion 94 functions as a penetrating portion and serves to actually penetrate the surface of the soil in actual operation of the device. The second portion of the earth engagement means is a stabilizing portion 96 which is inclined upwardly and rearwardly with respect to the penetrating portion 94 and resembles an inclined plate. This stabilizing portion 96 serves to assist the keeping the earth engagement means in the ground during the horizontal movement of the device across the ground. The third portion 98 functions as a separating portion to effectively slit the turf and subsequently disturb it as minimally as possible. The dimension from the outermost portion of the sides of the penetrating portion 94 of the earth engagement means 92 is approximately 6". The penetrating portion 94 is formed having a upper surface 100 and lower surface 102 as well as a penetrating portion side wall 104, a tip portion 105 which may either be in the form of a sharp tip or merely a somewhat truncated one as is shown in FIG. 4. The stabilizing portion 96 is formed having an inclined surface 106 with its inclined surface bottom 108 secured to the rearward portion 110 of penetrating portion 94. The inclined surface 106 also has an inclined surface top 112 which extends to the upper edge 114 of separating portion 98. The separating portion 98 also features separating portion side walls 116. Preferably the earth engagement means can be formed as a unitary structure, although the individual components could be welded to one another with the earth engagement means then being welded to the forwardly extending portion 90 of shoe 65.

As can best be seen in FIGS. 1 and 2 a coulter 120 is also preferably provided. The coulter is adjusted relative to main beam 50 by a coulter wheel actuator 122 which is hydraulically powered in the same way as are transport cylinder 58 and grade cylinder 66. The coulter wheel actuator has its first end 123 secured to a coulter swing arm 124. While the coulter wheel actuator second end 125 is secured to a coulter actuator arm 126 which is in turn secured to main beam bracket 55. Preferably the coulter utilized with the invention is an 18" coulter such that a 5" deep cut is the maximum penetration of the coulter into the soil which is required.

The invention also makes use of a laser system 130. Laser systems have been used previously in connection with the much heavier prior art devices for installing pipe. The laser system 130 associated with this invention is of the same commercial embodiment usable with such prior art pipe installation devices. The laser system 130 comprises a laser stand 132 which is secured to the shoe top 74 and on which laser stand 132 a laser 133 is secured. A slope sensor 134 is attached to one of the shoe side walls at a position above the juncture of the main beam with the shoe. The wiring associated with the laser system is of the type already known in the art. Similarly the hydraulic lines associated with the various cylinders and the hydraulic control are all of the type well known in the art as being associated with standard hydraulic setup.

In actual operation, a hole is dug to a depth sufficient for starting the installation of the pipe 140. Although this could be done by hand it preferably is done by using a back-hoe. Once the hole has been dug in the ground such that the shoe portion of the device may be lowered therein, the shoe is positioned above the hole and lowered thereinto. Once the shoe is lowered into the hole, pipe may begun being fed through the front wall of the shoe downwardly through the pipe channel and out into the desired depth and attack angle through the use of the laser system 130. Although different types of plastic pipe of suitable dimension could be used, the configuration of pipe similar to disclosed in U.S Pat. No. 4,904,113 has been found to work extremely well.

The ground is then engaged with the forwardly extending portion of the shoe, specifically the earth engagement means and the penetrating portion thereof. The device is then made to move across the ground either by the use of a tractor or winch during which movement the pipe is passed through the front wall of the shoe approximately midway between the top and bottom of the shoe front wall and downwardly through the pipe channel into the ground at the desired depth.

FIG. 5 discloses the machine in actual use with the movement across the ground being caused by a winch. Most notably the shoe is no longer in the position shown in FIG. 1 since the lower portions thereof are now beneath the turf in a pipe laying mode. During the movement of the device across the ground, the laser system may be in an automatic operating mode as is well known in the art associated with these laser systems. Alternatively, manual control can be effectuated using the hydraulic controls shown in FIG. 1. The coordination of the laser system with the laying of pipe is known in the art and although the fabrication of the machine is different than those machines associated with the prior art pipe installation devices, the laser system functions in the known manner. Once sufficient pipe has been laid, the earth engagement means and forwardly extending portion 90 are inclined upwardly such that the shoe raises out of the earth.

The machine disclosed by this invention can function with a weight of only 1200 pounds as opposed to the 60,000 pounds which often is associated with prior art machines. However, since the device may need to generate up to 40,000 pounds of drawbar pull, additional weight may be provided to the machine either through the use of heavier components or through the addition of plates 136 which are secured to the skid plate 18.

While the form of apparatus and method herein described constitutes a preferred embodiment of this invention it is to be understood that the invention is not limited to this precise form of apparatus or method and that changes may be made therein without departing from the scope of the invention which is defined in the appended claims.

What is claimed is:

1. A device for installing pipe, said device comprising
    a chassis, said chassis comprising a frame beam, an upright beam, and a main beam which pivots relative to said frame beam, said main beam having directly attached thereto both a transport cylinder and a grade cylinder, said transport cylinder also attached to said upright beam, and
    a shoe, said shoe having a pipe channel extending therethrough, said grade cylinder also attached to said shoe, said main beam also attached to said shoe, said shoe pivoting relative to said main beam.

2. The device according to claim 1 which includes a fuel tank, a hydraulic fluid tank, a battery and hydraulic controls.

3. The device according to claim 1 which includes a support beam, said support beam attached to said frame beam and said upright beam.

4. The device according to claim 1 which includes a hitch beam, said hitch beam comprising a hitch, said hitch beam having a skid plate attached thereto.

5. The device according to claim 1 wherein said frame beam is supported by a wheel.

6. The device according to claim 1 wherein said shoe comprises a front wall and a rear wall, said pipe channel extending between said front wall and said rear wall.

7. The device according to claim 6 wherein said shoe has attached thereto a laser system, said laser system comprising a laser and a slope sensor.

8. The device according to claim 1 wherein said shoe has a forwardly extending portion comprising means for earth engagement, said earth engagement means comprising a penetrating portion, a stabilizing portion and a separating portion.

9. The device according to claim 1 which includes a coulter, said coulter attached to said main beam by a coulter swing arm.

10. The device according to claim 9 wherein said coulter is adjusted relative to said main beam by a coulter wheel actuator, said coulter wheel actuator attached to said coulter swing arm and to a coulter actuator arm, said coulter actuator arm also attached to said main beam.

11. The device according to claim 1 which includes a support beam, and a coulter, said support beam attached to said frame beam and said upright beam, said shoe comprising a front wall and a rear wall, said pipe channel extending between said front wall and said rear wall, said coulter attached to said main beam by a coulter swing arm, said device having attached thereto a laser system, said laser system comprising a laser and a slope sensor.

12. The device according to claim 11 wherein said shoe has a forwardly extending portion comprising means for earth engagement, said earth engagement means comprising a penetrating portion, a stabilizing portion and a separating portion.

13. A device for installing pipe, said device comprising
 a chassis, said chassis comprising a frame beam supported by a wheel, an upright beam, a support beam, a hitch beam, and a main beam which pivots relative to said frame beam, said main beam having attached thereto a transport cylinder and a grade cylinder, said transport cylinder also attached to said upright beam, said support beam attached to said frame beam and said upright beam, said hitch beam comprising a hitch attached thereto, and having a skid plate, a fuel tank, a hydraulic tank, a battery and hydraulic controls connected to said chassis,
 a coulter, said coulter attached to said main beam by a coulter swing arm, said coulter adjusted relative to said main beam by a coulter wheel actuator, said coulter wheel actuator directly attached to both said coulter swing arm and to a coulter actuator arm, said coulter actuator arm also attached to said main beam, and
 a shoe, said shoe having a pipe channel extending therethrough, said shoe comprising a front wall and a rear wall, said pipe extending between said front wall and said rear wall, said shoe having a forwardly engaging portion comprising means for earth engagement, said earth engagement means comprising a penetrating portion, a stabilizing portion and a separating portion, said grade cylinder also attached to said shoe, said main beam also attached to said shoe, said shoe pivoting relative to said main beam.

14. The device according to claim 13 wherein said shoe has attached thereto a laser system, said laser system comprising a laser and a slope sensor.

* * * * *